United States Patent
Passalacqua

(10) Patent No.: US 7,700,217 B2
(45) Date of Patent: Apr. 20, 2010

(54) ELECTROLYTE MIGRATION CONTROL FOR LARGE AREA MCFC STACKS

(75) Inventor: Biagio Passalacqua, Camogli (IT)

(73) Assignee: Ansaldo Fuel Cells S.p.A., Genoa (IT)

( * ) Notice: Subject to any disclaimer, the term of this patent is extended or adjusted under 35 U.S.C. 154(b) by 1063 days.

(21) Appl. No.: 10/573,402

(22) PCT Filed: Sep. 23, 2003

(86) PCT No.: PCT/EP03/10589

§ 371 (c)(1), (2), (4) Date: Mar. 23, 2006

(87) PCT Pub. No.: WO2005/029630

PCT Pub. Date: Mar. 31, 2005

(65) Prior Publication Data

US 2006/0275641 A1    Dec. 7, 2006

(51) Int. Cl.
*H01M 8/24* (2006.01)
*H01M 8/14* (2006.01)
*H01M 8/02* (2006.01)

(52) U.S. Cl. ............... 429/38; 429/35; 429/14

(58) Field of Classification Search ............. 429/12–46
See application file for complete search history.

(56) References Cited

U.S. PATENT DOCUMENTS 4,761,348 A * 8/1988 Kunz et al. .................. 429/35
5,019,464 A * 5/1991 Mitsuda et al. ............... 429/34
2004/0121200 A1 * 6/2004 Johnsen et al. ............... 429/16

FOREIGN PATENT DOCUMENTS

CA    2410005    * 12/2001

\* cited by examiner

*Primary Examiner*—Basia Ridley
*Assistant Examiner*—Jacob Buchanan
(74) *Attorney, Agent, or Firm*—Stetina Brunda Garred & Brucker

(57) ABSTRACT

The present invention relates to a new strategy against the electrolyte migration through the gasket in externally manifolded MCFC stacks. This is obtained by endowing a stack of molten carbonate fuel cells (MCFCs) of an electrolyte management tool separated from the cells by an electronically conductive material which is impervious to gas, characterized by the combination of the following elements:—a positive reservoir component external to the cathode of the first cell on the positive side of the battery, wherein said reservoir consists of one ore more porous layers of electronically conductive material and comprises at least one gas distributor, and—a negative reservoir component external to the anode of the last cell on the negative side of the battery, wherein said reservoir consists of one ore more porous layers of electronically conductive material.

16 Claims, 3 Drawing Sheets

ELECTROLYTE MIGRATION CONTROL FOR LARGE AREA MCFC STACKS

FIELD OF THE INVENTION

The present invention relates to a Molten Carbonates Fuel Cell apparatus which allows to achieve an active control of the electrolyte migration through the gasket in externally manifolded stacks. The aim is to minimise the impact of this effect on performance, when the stack is constituted by a large number ($\geqq 50$) of large area ($\geqq 3500$ cm$^2$) cells. Such a strategy does not require modifications to particular cells, but all the cells can be made by the same components.

BACKGROUND OF THE INVENTION

A fuel cell is a device that uses hydrogen (or hydrogen-rich fuel) and oxygen to create electricity by an electrochemical process.

A single fuel cell consists of an electrolyte sandwiched between two thin electrodes (a porous anode and cathode). There are different fuel cell types, for all hydrogen, or a hydrogen-rich fuel, is fed to the anode, oxygen, or air, to the cathode.

For instance, for polymer exchange membrane (PEM) and phosphoric acid fuel cells, protons, generated by the anode reaction, move through the electrolyte to the cathode to combine with oxygen and electrons, producing water and heat.

For alkaline, molten carbonate, and solid oxide fuel cells, negative ions travel through the electrolyte to the anode where they combine with hydrogen to generate water and electrons. The electrons from the anode side of the cell cannot pass through the membrane to the positively charged cathode; they must travel around it via an electrical circuit to reach the other side of the cell. This movement of electrons is an electrical current.

Molten Carbonate Fuel Cells (MCFC) are in the class of high-temperature fuel cells. The higher operating temperature allows them to use natural gas directly without the need for a fuel processor and have also been used with low-Btu fuel gas from industrial processes other sources and fuels. Developed in the mid 1960s, improvements have been made in fabrication methods, performance and endurance.

MCFCs work quite differently from other fuel cells. These cells use an electrolyte composed of a molten mixture of carbonate salts. Two mixtures are currently used: lithium carbonate and potassium carbonate, or lithium carbonate and sodium carbonate. To melt the carbonate salts and achieve high ion mobility through the electrolyte, MCFCs operate at high temperatures (650° C.).

When heated to a temperature of around 650° C., these salts melt and become conductive to carbonate ions ($CO_3^{2-}$). In operation, these ions are generated by the cathode reaction and flow from the cathode to the anode where they combine with hydrogen to give water, carbon dioxide and electrons. These electrons are routed through an external circuit back to the cathode, generating electricity and by-product heat.

The reactions which take place are the following:

Anode Reaction: $CO_3^{2-}+H_2 \Rightarrow H_2O+CO_2+2e^-$

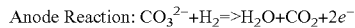

Cathode Reaction: $CO_2+\frac{1}{2}O_2+2e^- \Rightarrow CO_3^{2-}$

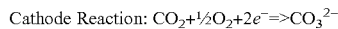

Overall Cell Reaction: $H_2(g)+\frac{1}{2}O_2(g)+CO_2$ (cathode) $\Rightarrow H_2O(g)+CO_2$ (anode)

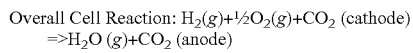

The higher operating temperature of MCFCs has both advantages and disadvantages compared to the lower temperature PAFC and PEFC. At the higher operating temperature, CO is a fuel and not a poison, with formidable benefit in terms both of fuel source acceptability and of methane reforming. Moreover, with regard to the reforming of natural gas, it can occur by using directly as thermal source the waste heat itself of the MCFC. Additional advantages include the ability to use standard materials for construction, such as stainless steel sheet, and allow use of nickel-based catalysts on the electrodes. The by-product heat from an MCFC can be used to generate high-pressure steam that can be used in many industrial and commercial applications.

With regard to the main functional requirements, the complete filling of every interstice in the porous ceramic component inserted between anode and cathode (electrolyte matrix) is a key factor. This not only constitutes a barrier for the gases but also prevents the sinking of performance (in fact, in the vacancies of electrolyte the transport to the anode of the $CO_3^{2-}$ ion generated by the cathode does not occur). For both the electrodes, an essential characteristic for the completion of the reactions is the constant presence of a triphasic contact surface gas/$C_3^{2-}$ ion/electron. It is then evident that besides the electro-catalytic properties of the electrode material, the performance depends on the access/removal from the reaction sites of gas and $CO_3^{2-}$ ion. The performance is therefore unacceptable as well when the electrodes are "flooded" as when the electrolyte quantity is insufficient.

For each of the two electrodes there is an optimal filling degree for enhancing the performances; moving away from it means diminishing the efficiency degree. There is anyway a range in which such degree is still acceptable and the cells characteristics can be in any case exploited.

In working condition, since the carbonates amount gradually decreases, the filling degree changes with the time. In order to maintain the filling levels higher then the minimum required, it is necessary to start from filling levels which are higher than the optimal ones.

The carbonates distribute spontaneously in the pores with higher capillary retention properties.

In order to control the electrolyte repartition among components, it is necessary to choose the correct volumes in the design of the cell and respect a rigorous hierarchy on the base of their retention properties.

Since it is necessary that the matrix remains in any case full, the diversion of the filling degree must regard exclusively the electrodes. The reaction at the anode is less penalized than the one which takes place at the cathode by the filling degrees which are far away from the optimal values. Hence, the design of the cell tends therefore to use the anode by concentrating on it the initial surplus of electrolyte and evacuating it for first. The configuration of a single cell consists of a 3-layers "sandwich" (anode, matrix of electrolyte, cathode) placed between metallic pieces intended for the distribution of gas and for the transport of current. In practice, a molten carbonate fuel cell (which conventionally is indicated with the word "stack") is a modular structure constituted by many elementary cells electrically connected in series but with parallel gas inlets. The electrical connection between the cells is achieved with a metallic separator (electronic conductor) between the anode compartment of the one cell and the cathode compartment of the adjacent one. At each end of the cell there is a metallic plate; they are normally indicated as "end plates", one at the anode and the other at the cathode.

In order to provide the single cells with gas, the commonly used ways are two: external manifold and internal manifold. In the first case each one of the four lateral faces has a specific function: fuel inlet, fuel outlet, oxidation agent inlet, oxidation agent outlet. The first and the second couple of faces are in opposite positions to each other. Normally, on every face a manifold is placed directly against the face of the cells pack. From the internal area to the manifold the gas reaches directly the parts to which it is designated.

In the internal manifold, the inlet conducts of the gas to the single cells are obtained through complex grooves in the bipolar plates which divide one cell from the other.

STATE OF THE ART

The state of the art has been till now confronted with the problems connected to the use of an external manifold of the electrolyte migration through the gasket of the manifold. With the external manifold, the necessary tightness for maintaining the gas separated from the external environment requires the use of a gasket on the perimeter of the cell pack surface which is in contact with the manifold.

For technical reasons the use of a metallic o-ring is not possible: the actual solutions regard the use of different materials, like for example, tissues and caulks which normally are mixtures of ceramic powders with the add of fluidizing means. In any case, the result is a porous structure permeable to the electrolyte and in communication with the electrolyte of all the cells. As a consequence, the single cells could not be considered independent, since the gaskets of the manifold represent possible passages of electrolyte from one cell to another.

In the stack the cells are electronically connected in series: consequently there is a potential gradient along the stack between the two ends. This causes a migration of the alkaline ions of electrolyte through the gaskets from the cells which are on the positive extremity to the cells connected to the negative one, with subsequent "over production" of the $CO_3^{2-}$ ions in the "negative" cells and with a corresponding "depletion" in the "positive" cells. The cells which are on the positive extremity of the stack show a loss of electrolyte, in addition to the loss which is caused by consumption mechanisms.

By changing the gasket characteristics, even the electrolyte quantity which is transferred from the positive to the negative side of the stack is different. This quality does not depend on the number of cells contained in the stack: the migration involves only the cells at the two extremities and it does not interest the internal ones.

The consequences for the cells at the positive extremity are always the same: the anticipated emptying causes a performance fall and, because the electrolyte quantity in the electrodes becomes insufficient, when the emptying process reaches a critical level the electrolyte matrix loses its tightness properties to the gases and the mixing of fuel and oxidant takes place directly into the cell, with the consequent quick degradation of hardware.

Depending on the cells surface, on its internal structure and on the configuration of the gasket, the time which is necessary to reach critical conditions changes but the dynamic of the mechanisms is always the one cited above. For the cells at the negative side the risk is a flooding of the electrodes with a significant fall of performance. This mechanism extends then to a higher and higher number of cells depending on the flooding level of the extremity cells. Furthermore, unless particular compositions are used, the mobility of the alkaline ions in the electrolyte is different (like for example the one of the ions $Li^+$ and $K^+$ for the binary eutectic at 62 mol % Li and 38 mol % K, which has always been the reference composition).

Since this causes that the migration speeds by the gaskets are different, at the negative side the electrolyte shows a higher concentration of the most mobile ion ($K^+$ in the before cited example), and at the positive side of the less mobile ion ($Li^+$ in the example). This phenomenon alters further the cells performance at the two extremities and, in particular cases, it could also lead to the solidification of the electrolyte at the working temperature (650° C.).

For the cells at the negative side of the stack, the dynamic of the mechanisms changes radically in accordance to different factors, in particular the surface of the cell, its internal structure, the composition of the electrolyte in the different cells and the configuration of the gaskets.

In order to avoid the consequence of the migration of electrolyte in molten carbonate fuel cells with external manifold, a known solution used in the state of the art is to differentiate the internal structure of some cells which are connected to the positive side of the stack, and of other cells which are connected the negative side.

Accordingly, the solution regards firstly the use of thicker electrodes so that the electrolyte disposes, inside of them, of a greater volume in comparison to the one of the electrodes in ordinary cells which are "internal" to the stack and secondly in a different load of electrolyte in the "more external" cells, having a higher quantity of it in the cells at the positive side.

In any case, considering the migration phenomenon even by using the best gaskets, in order to fabricate stacks which should last 40,000 it would be necessary to use in the "more external" cells electrodes which should be 8 to 10 times thicker than the ones in the ordinary cells.

With an internal structure which is so different from the optimal one, the functionality of such "reservoir cells" is so compromised that in particular operating conditions could also consume energy instead of producing it. Furthermore the presence of non-standard components has a negative influx on the fabrication costs: in particular, it is necessary to print and to treat separately the separator plates.

Additionally, in the start-up cycle of the stack the presence of "reservoir cells" slows down the entire process, with consequent technological and economical disadvantages.

Another approach tends to limit the migration effect through the control of particular properties of the gasket. This is for example the case of the U.S. Pat. No. 5,110,692 of Farooque et al. The solution consists in the introduction of different barriers in the gasket parts which are involved in the migration process. Those barriers should slow the electrolyte flux. The application of such a solution involves high costs and is also quite difficult to apply: it has also a very weak effectiveness which is affected by movements of the parts very difficult to be controlled during the working process.

Another approach consists in limiting the electrolyte transfer from the cells to the gaskets by modifying the porous characteristics of the components in the cells corner range, where the contact with the gaskets occurs. In this zone it is necessary to create dry ranges of electrolyte which have to be organised in "labyrinths" because the separation between the anodic and the cathodic gases must be in any case maintained.

An example of this kind of solution is disclosed in the U.S. Pat. No. 4,659,635 by Raiser et al. and in the U.S. Pat. No. 5,478,663 by Cipollini et al. The above-mentioned modifications should be incorporated in all the cells and not only in the external ones (i.e. the ones which normally are involved in the migration process). This is because otherwise, on the side of the positive pole, the first cells to be evacuated would be the non-protected ones instead of the protected ones and on the contrary at the negative side the first cells to be flooded would be the non-protected ones instead of the protected ones. Those solutions appear to be too expensive to be applied.

Consequently, all the cited solutions are characterised by a weak commercial convenience and by technical ineffectiveness.

Another solution proposed by the prior art consists in limiting the enrichment on $K_2CO_3$ by the cells at the negative pole. The way of obtaining it is disclosed in the U.S. Pat. No. 4,591,538. In the binary electrolyte $Li_2CO_3/K_2CO_3$ if the molar fraction of $Li_2CO_3$ is 72%, the ions Li+ and K+ have the same mobility; therefore, in order to prevent the migration process a molar fraction of $Li_2CO_3$ comprised between 70% and 73% is claimed here.

But such a solution, in absence of complementary tools, remains totally ineffective against the drying\flooding phenomena of the extreme cells.

A further way for limiting the electrolyte migration without compromising the gas exchange and the current transport is proposed in the U.S. Pat. No. 4,761,348 by Kunz.

The solution consists in the combination of three elements:
a first porous layer (reservoir) at the negative pole of the stack with at least a portion of its lateral face exposed to the oxidant gas and in communication through the electrolyte with the gasket, separated from the last cell by means of a conductive plate which is impermeable for the electrolyte;
a second porous layer (reservoir) at the positive pole of the stack, with at least a portion of its lateral face exposed to the fuel gas and in communication through the electrolyte with the gasket and which is separated from the first cell by means of a conductive plate which is impermeable for the electrolyte;
the use between the manifold and the most external plate of a gasket which is thicker than the one used between manifold and cells.

The evident limit of this patent lays on the fact that in both the reservoirs the gas access is allowed only through the porosity of the layers which form the reservoir itself and the performance of the complete process is therefore strongly diminished.

A way to avoid such a limit is disclosed by the patent U.S. Pat. No. 5,019,464 of Mitsada and others, which describes the combination of:
at the positive side, exposed to the fuel manifold, a reservoir constituted by one or more anodes and endowed with a current collector\gas distributor
at the negative side, exposed to the oxidant manifold, a reservoir constituted by one or more cathodes and endowed with a current collector\gas distributor The main limit of the solution described by such a patent is related to the ohmic losses generated by the stack current through the cathodes of the "negative" reservoir. Usually such penalties become greater than the benefit for the cell area of interest for commercial applications.

SCOPE OF THE INVENTION

Scope of the present invention is therefore to find a convenient way to control the electrolyte migration process in large area MCFC stacks without incurring in the disadvantages of the prior art.

The solution to this problem is to endow the molten carbonate fuel cells (MCFCs) stack with an electrolyte management tool, based on a slightly different combination of external reservoirs, which however provides a radically different approach to compensate the electrolyte migration process.

Namely also such a tool is based on a combination of two reservoir, one for each side of the stack, both separated from the active cells by an electronically conductive material which is impervious to gas; but a key feature of such innovative solution is that both are exposed exclusively to fuel gas environment and inaccessible to the oxidant gas.

More specifically such electrolyte management tool is characterized by the combination of the following elements:
a positive reservoir component, external to the cathode of the first cell on the positive side of the battery, wherein said reservoir consists of one or more porous layers of electronically conductive material and comprises at least one gas distributor and
a negative reservoir component, external to the anode of the last cell on the negative side of the battery, wherein said reservoir consists of one or more porous layers of electronically conductive material reservoirs both exposed exclusively to fuel gas environment and inaccessible to the oxidant gases.

Electronically conductive material impervious to gas separates respectively the positive reservoir from the cathode of the first cell on the positive side of the stack and the negative reservoir from the anode of the last cell on the negative side of the stack. The positive reservoir element is accessible to gases at least on one of the faces formed by the lateral surfaces of the cells, in which fuel gas is present and is separated from oxidant gases. In other words if, for instance, the positive reservoir is exposed to the fuel inlet zone, the other three faces formed by the lateral surfaces of the cells are exposed respectively
to the oxidant gas fed to the stack,
to an exhausted oxidant gas outlet zone and
to an exhausted fuel gas outlet zone.

Namely, as standard for externally manifolded stacks, on every face, the gas is contained in a zone which is separated from the external environment by means of gaskets attached to the perimeter of the face and some parts of said gaskets are in contact with portions of the cells matrix.

The positive and the negative reservoirs too are in communication through the electrolyte with gaskets which are in contact with the matrixes of the cells. Both the porous layers of the positive and of the negative reservoir comprise at least 50 wt % of Ni; in particular, additionally, in one or in both the reservoirs those layers can further comprise elements consisting of anodes which are identical to the ones of the cells.

Porous gaskets are compressed on the perimeter of each of the 4 lateral faces and thus the pore volume originally available is significantly decreased. In a preferred embodiment, inside the strips which connect the matrix of the first cell at the positive pole to the matrix of the last cell at the negative pole, the volume of the residual porosity is <4% Such porosity is available to electrolyte for migration. Every cell of the stack comprises an anode, an electronically conductive fuel gas distributor, a cathode, an electronically conductive oxidant gas distributor and an electrolyte containing matrix. Preferably, the number of the cells is >50 and their area is >3500 $cm^2$.

Two key features of the innovative combination are:
positive reservoir in fuel environment and endowed with gas distributor
negative reservoir exclusively in fuel environment (irrelevant if endowed with gas distributor or not)

Such a combination, fully effective against the drying of the cells near to the positive pole, renounces to fully prevent the flooding of the "last" cell at the negative end of the stack. Its aim is to "stabilize" the flooding on a limit value and consequently to fully prevent any extension of flooding to the other cells.

The key advantages are the fully negligible ohmic losses across the reservoirs. For stacks of large surface cells such advantage, in the whole lifetime of the stack, is higher than the penalty of performance arising from the intrinsically delayed (and partial) flooding of one alone cell.

Namely, to decrease the emptying rate of the "first" one cell at the positive side, is necessary to make competitive the positive reservoir as "source" of positive ions for the gaskets.

This means that the reactions with the gas to eliminate the $CO_3^{2-}$ ion must to can occur without penalties inside the positive reservoir, in comparison with the alternative inside the "first" one cell. This is possible only in presence of two concomitant factors:

positive reservoir operating in fuel environment
positive reservoir endowed with a gas distributor.

Symmetrically, to decrease the flooding rate of the "last" one cell at the negative side, is necessary to make competitive the negative reservoir as "collector" of positive ions from the gaskets.

This means to promote the forming of the CO3=inside the negative reservoir. This is possible only in presence of two concomitant factors:

negative reservoir operating in cathodic environment
negative reservoir endowed with a gas distributor.

The ohmic losses in cathodic environment are quite high, in fuel environment negligible; therefore it's evident that any effort to fully prevent the flooding of the cells at the negative end by a "cathodic" reservoir introduces ohmic losses.

Instead the ohmic falls produced by the passage of the stack current through an "extra-anodes" reservoir (i.e. a reservoir exposed exclusively to fuel environment) are negligible and stable with time.

For instance a positive reservoir split in sections, each constituted by 2 extra-anodes and 1 one collector/distributor, shows ohmic losses in the range of 1-2 mV across each section.

The volume available to store electrolyte inside the positive reservoir can be increased, to meet increased life target, simply by increasing the number of conductive porous layers and eventually also of gas distributors inside the reservoir. A set of one current collectors and related porous layers is a "section" of the reservoir.

Different sections are separated by metallic sheets. By endowing the positive reservoir with many sections, the delivery of positive ions to the gasket occurs at the same speed in every section. Namely so low voltage drops across the sections do not produce sufficient counter fields to affect the efficacy of the farthest sections, so that even for a positive reservoir with 5-10 sections all concurs with comparable effectiveness to the cell protection.

By changing the gasket, the electrolyte quantity transferred in a particular time interval from the positive side of the stack to the negative one changes. But when using the same gasket this quantity does not depend either on the cells number or on the cells area. The influence of the migration effect for a particular cell, on the contrary, depends directly on the cell surface: for small-area cells in brief time laps the electrolyte quantity transferred is already relevant relatively to the carbonates content of the cell. For "commercial" cells of large area, instead, many thousands hours are necessary before the effect can be noted.

By means of the MCFC apparatus of the present invention, it is possible to avoid the anticipated emptying of the cells at the positive pole, which could cause a power drop and the mixing of the anodic and cathodic gases, what generates devastating hardware degeneration.

The protection of positive cells with a reservoir of extra anodes endowed with the collector of current\gas distributor, allows to reach 40,000 hours of working time with a power loss which for a stack of 125 kW is minor of 0.02 percent of the power in the entire "working life".

By using a reservoir of extra-anodes even at the negative pole, as it is exposed exclusively to fuel environment, under operating conditions the Li and K ions from the gasket flow in the last negative cell, because the formation of $CO_3^{2-}$ occurs more easily on the cathode of the cell than in the reservoir. Therefore the mechanism which active the flooding of the last "negative" cell is not avoided. Nevertheless, the negative reservoir is in communication through the electrolyte with the last cell and both the cell and the reservoir, which is in fuel environment, are at the same voltage. In those conditions, together with the gradual flooding of the cell, the gradual filling of always bigger pores by the electrolyte, do active the driving force for a capillary transfer of electrolyte into the large volume of smaller, free pores available in the reservoir.

With this process, the systematic removal of electrolyte from the last cell generates a dynamic flow which limit the flooding level of the most "negative" cell and, consequently, leads to the effective "protection" of all the other cells. The protection times can be easily extended by changing the number of extra-anodes in the negative reservoir which gives a larger volume for receiving a greater quantity of electrolyte. In the negative reservoir, as the electrolyte is collected by capillary forces, the presence of a gas distributor is not indispensable.

The ohmic losses are active in the whole lifetime of the stack and are increasing proportionally to the reservoir size. Instead the polarization losses, caused by flooding, are active only after that the flooding is started. For large area cells, no flooding occurs, neither in the most "negative" cell, for at least about 10,000hours. With the proposed solution, ohmic losses remains negligible even by increasing the reservoir size; only one cell is affected by polarization losses due to flooding and moreover its flooding remains incomplete, as once reached a threshold, the protection mechanism of the negative reservoir is activated.

Therefore, the use of extra anodes results to be a solution which is in any case technically and economically convenient; additionally, it allows to reach an absolutely irrelevant margin of power loss during the entire operating time of the stack.

DESCRIPTIONS OF THE DRAWINGS

The following embodiments of the invention have a pure explanatory nature and should be therefore interpreted without any restriction to the general inventive concept.

Figure 1:
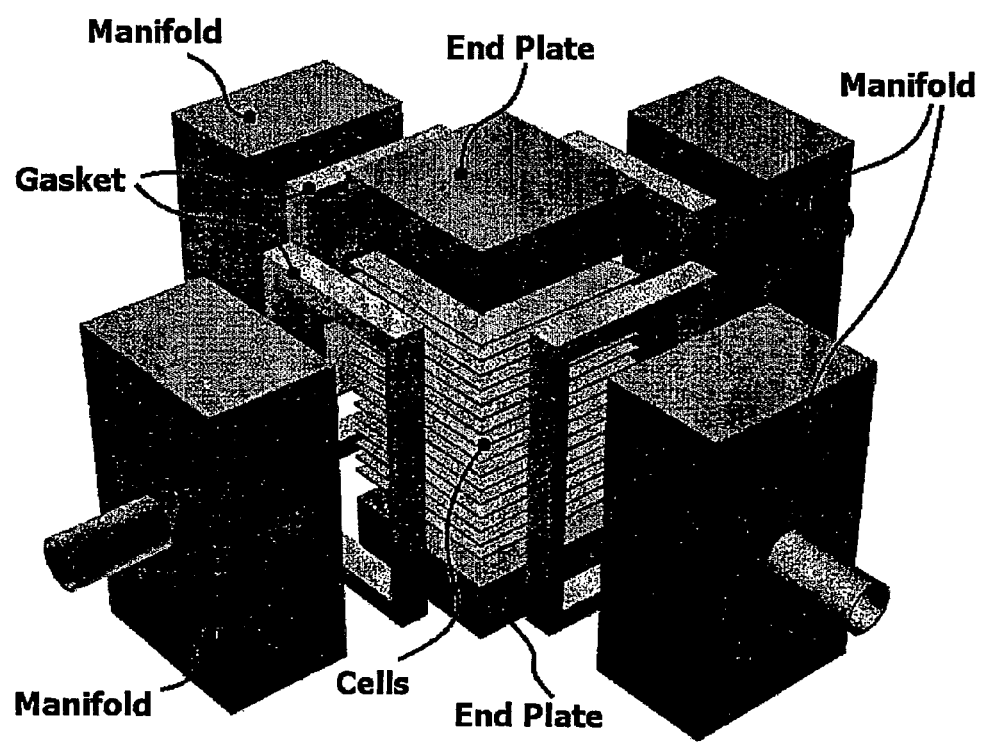
FIG. 1 shows an overview of the components disclosed in the present invention.
Figure 2:
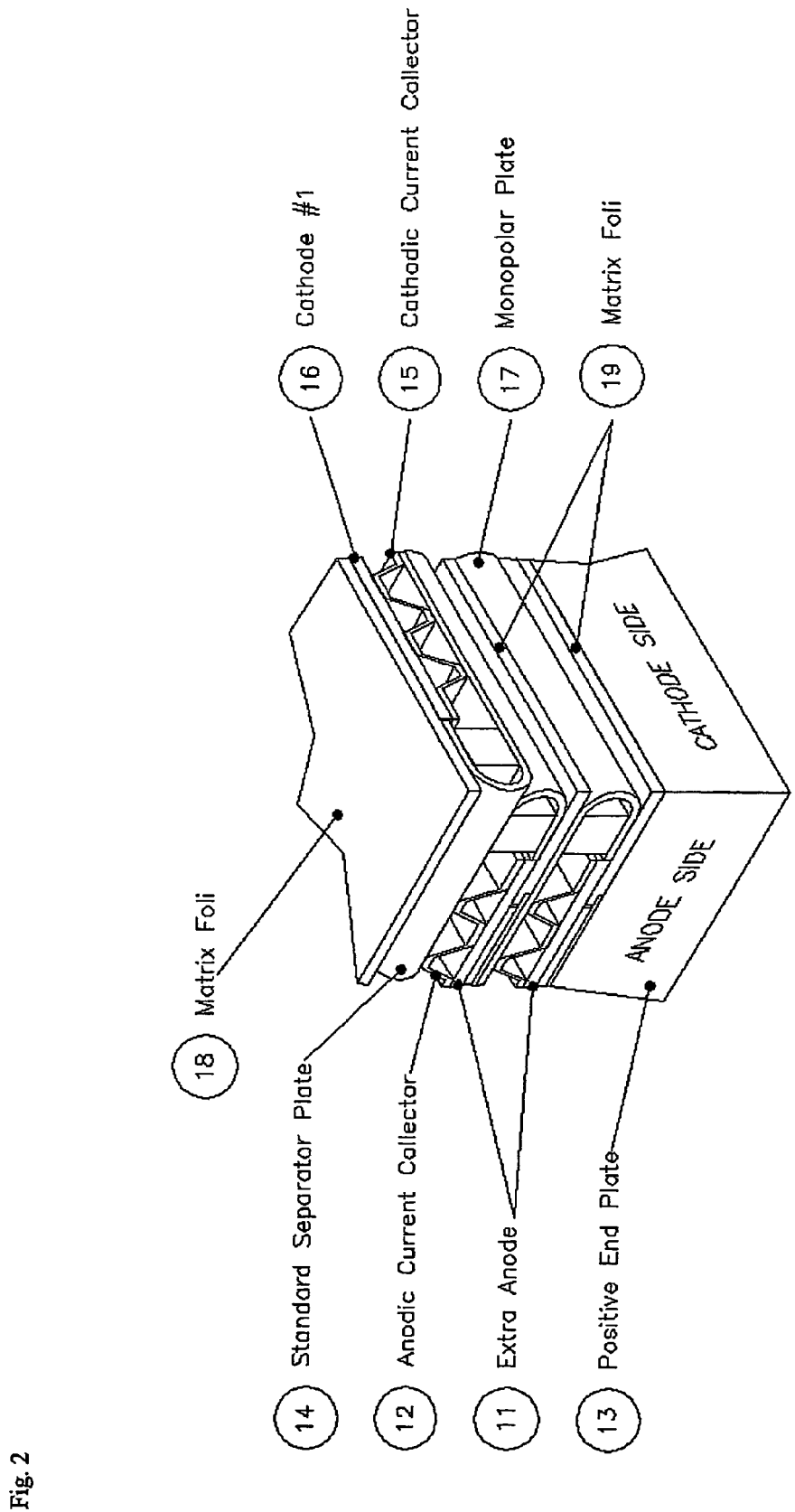
FIG. 2 shows a possible embodiment of the reservoir at the positive side of the stack.

Referring to the embodiment shown in FIG. 2, the reservoir is located between the positive plate 13 and the cathode of the first cell at the positive side, from which it is separated by means of a separating plate 14 which is of the same type of the plates used to separate the cells in the stack. Also the current collector\gas distributor 15, the cathode 16 and the matrix 18 of the first one cell are shown.

In the above example the positive reservoir is divided in two sections, where each one is constituted of two extra-anodes 11 and a current collector/gas distributor 12. The two sections are separated by the monopolar plate 17. If the sections in the reservoir are more than two, all the internal sections are separated by means of a monopolar plate similar to 17. The separation from the cathodic gas can be obtained through the matrix strips 19 filled by electrolyte.

Figure 3:
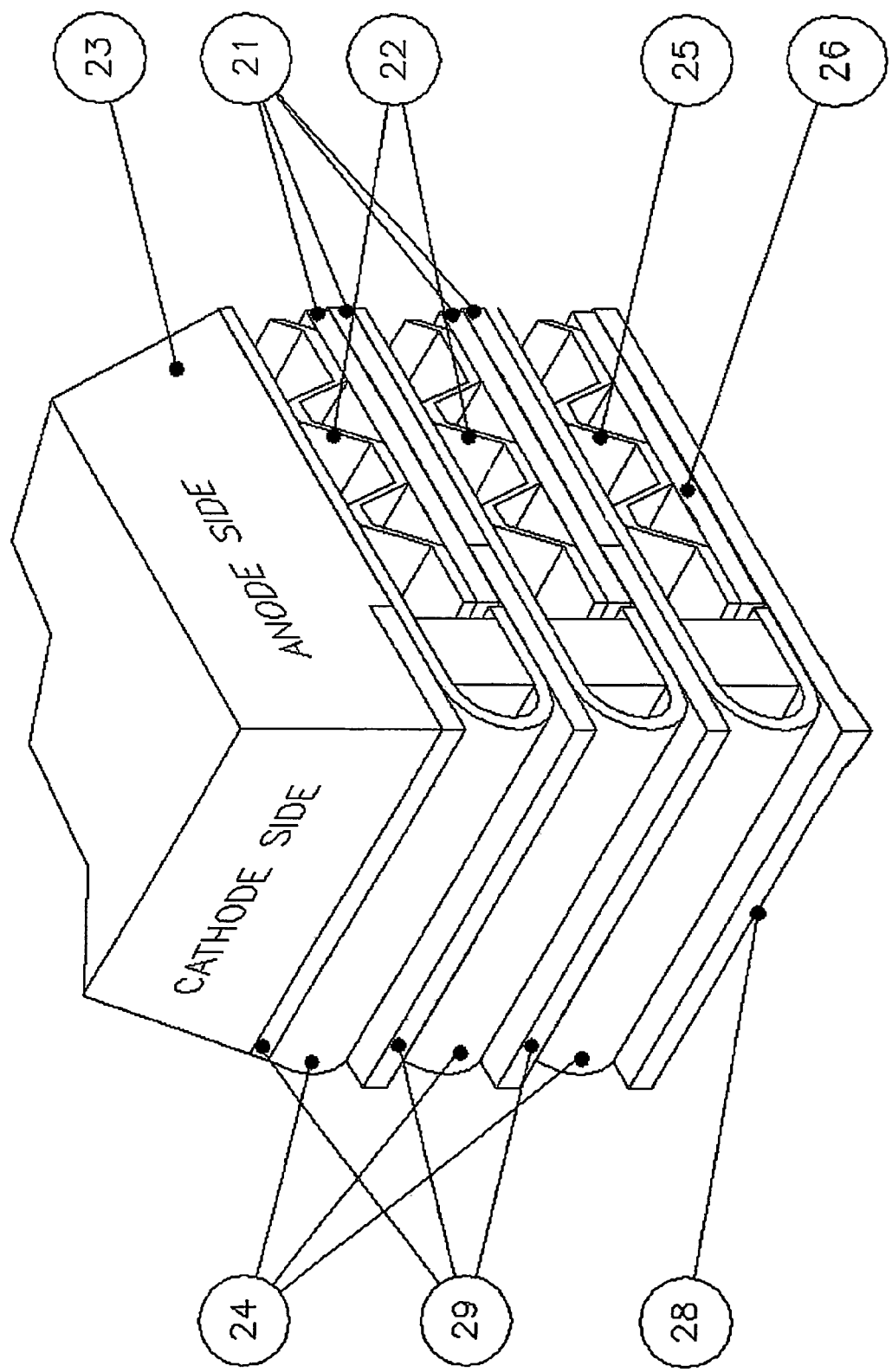
FIG. 3 shows a possible embodiment of the reservoir at the negative side of the stack.

Analogous to FIG. 2, FIG. 3 shows a possible embodiment of the reservoir at the negative side of the stack. This reservoir is inserted between the terminal negative plate 23 and the anode of the last cell at the negative side, from which it is separated by means of a separating plate 24. The current collector/gas distributor 25, the anode 26 and the matrix 28 of the last cell of the stack are also shown.

In the above example the positive reservoir is divided in two sections, where each one is constituted of two extra-anodes 21 and a current collector/gas distributor 22. The two sections are separated by the monopolar plate 24. The separation from the cathodic gas can be obtained through the matrix strips 29 filled by electrolyte.

If the sections in the reservoir are more than two, the internal sections are separated by means of a monopolar plate similar to 24.

In this reservoir, the current collector\gas distributor can be eliminated.

The invention claimed is:

1. A Molten Carbonate Fuel Cell stack comprising a plurality of cells separated by an electronically conductive material which is impervious to gas, characterized by the combination of the following elements:
   a positive reservoir component, external to the cathode of the first cell, on the positive side of the stack, wherein said reservoir consists of one or more porous layers of electronically conductive material and comprises at least one gas distributor and
   a negative reservoir component, external to the anode of the last cell, on the negative side of the stack, wherein said reservoir consists of one or more porous layers of electronically conductive material,
   wherein both the reservoirs are in use exposed exclusively to fuel gas environment and are inaccessible to the oxidant gases, all the porous layers of all the reservoir components being inaccessible to the oxidant gases.

2. Molten Carbonate Fuel Cell stack as defined in claim 1, wherein the positive reservoir is separated from the cathode of the first cell on the positive side of the stack by means of an electronically conductive material which is impervious to gas.

3. Molten Carbonate Fuel Cell stack as defined in claim 1, wherein the negative reservoir is separated from the anode of the last cell on the negative side of the stack by means of an electronically conductive material which is impervious to gas.

4. Molten Carbonate Fuel Cell stack as defined in claim 1 or 2, wherein the positive reservoir element is in use accessible to gases at least on one of the faces formed by the lateral surfaces of the cells, in which fuel gas is present and which is separated from oxidant gases.

5. Molten Carbonate Fuel Cell stack according to claim 1, wherein the positive and the negative reservoirs are in use in communication through the electrolyte with gaskets which are in contact with the matrixes of the cells.

6. Molten Carbonate Fuel Cell stack according to claim 1, wherein the positive and the negative reservoir are in use accessible to the fuel gas at the fuel inlet side while the other three faces formed by the lateral surfaces of the cells are in use exposed respectively to the oxidant gas fed to the stack, to an exhausted oxidant gas outlet zone and to an exhausted fuel gas outlet zone.

7. Molten Carbonate Fuel Cell stack according to claim 1, wherein the positive and the negative reservoir are in use accessible to the fuel gas at the exhaust fuel outlet side while the other three faces formed by the lateral surfaces of the cells are in use exposed respectively to the oxidant gas fed to the stack, to an exhausted oxidant gas outlet zone and to the fuel gas fed to the stack.

8. Molten Carbonate Fuel Cell stack according to claim 6, wherein gaskets are attached to the perimeter of the face, some parts of said gaskets are in contact with portions of the cells matrix and wherein in use on every face of the cell stack the gas is contained in a zone which is separated from the external environment.

9. Molten Carbonate Fuel Cell stack according to claim 1, wherein every cell of the stack comprises an anode, an electronically conductive fuel gas distributor, a cathode, an electronically conductive oxidant gas distributor and an electrolyte containing matrix.

10. Molten Carbonate Fuel Cell stack according to claim 1, wherein in porous gaskets compressed on the perimeter of the faces, the portions which connect the matrix of the first cell at the positive pole to the matrix of the last cell at the negative pole, have a volume of residual porosity in the gaskets which is <4%.

11. Molten Carbonate Fuel Cell stack according to claim 1, wherein the porous layers of the positive and of the negative reservoir comprise at least 50 wt% of Ni.

12. Molten Carbonate Fuel Cell stack according to claim 1, wherein in the porous layers of the positive and of the negative reservoir at least 50 wt % is Cu or Ni+Cu.

13. Molten Carbonate Fuel Cell stack according to claim 12, wherein the porous layers of the negative reservoir comprise elements consisting of anodes which are identical to the ones of the cells.

14. Molten Carbonate Fuel Cell stack according to claim 13, wherein the porous layers of the negative reservoir comprise elements consisting of anodes which are identical to the ones of the cells.

15. Molten Carbonate Fuel Cell stack according to claim 1, wherein the number of the cells is >50 and their area is >3500 $cm^2$.

16. A Molten Carbonate Fuel Cell stack comprising a plurality of cells separated by an electronically conductive material which is impervious to gas, characterized by the combination of the following elements:
   a positive reservoir component, external to the cathode of the first cell, on the positive side of the stack, wherein said reservoir includes one or more porous layers of electronically conductive material and comprises at least one gas distributor; and
   a negative reservoir component, external to the anode of the last cell, on the negative side of the stack, wherein said reservoir includes one or more porous layers of electronically conductive material;
   wherein both the reservoirs are in use exposed exclusively to fuel gas environment and are inaccessible to the oxidant gases, all the porous layers of all the reservoir components being inaccessible to the oxidant gases.

* * * * *